United States Patent [19]

Aftergut et al.

[11] Patent Number: 4,581,608

[45] Date of Patent: Apr. 8, 1986

[54] MULTI-COLOR LIQUID CRYSTAL DISPLAY AND SYSTEM

[75] Inventors: Siegfried Aftergut, Schenectady; Herbert S. Cole, Scotia; John E. Bigelow, Clifton Park, all of N.Y.; Alfred O. Saupe, Kent, Ohio

[73] Assignee: General Electric Company, Schenectady, N.Y.

[21] Appl. No.: 503,981

[22] Filed: Jun. 13, 1983

[51] Int. Cl.[4] .............................................. G09G 1/28
[52] U.S. Cl. ..................... 340/704; 340/784; 340/765; 350/332; 350/333
[58] Field of Search ............... 340/701, 703, 704, 765, 340/783, 784; 350/313, 316, 332, 333, 346

[56] References Cited

U.S. PATENT DOCUMENTS

| 4,035,690 | 7/1977 | Roeber | 340/703 |
|---|---|---|---|
| 4,241,339 | 12/1980 | Ushiyama | 340/784 |
| 4,448,490 | 5/1984 | Shibuya et al. | 340/784 |
| 4,485,376 | 11/1984 | Noble | 340/784 |

FOREIGN PATENT DOCUMENTS

| 0045894 | 4/1977 | Japan | 340/784 |
|---|---|---|---|
| 0034496 | 3/1978 | Japan | 340/784 |
| 0034542 | 3/1978 | Japan | 340/784 |

*Primary Examiner*—Gerald L. Brigance
*Assistant Examiner*—Jeffery Brier
*Attorney, Agent, or Firm*—Geoffrey H. Krauss; James C. Davis, Jr.; Marvin Snyder

[57] ABSTRACT

A multi-color liquid crystal display has a one-dimensional or two-dimensional array of at least one display cell, with a plurality of different liquid crystal host/guest dichroic dye compositions in each cell. Each of the different liquid crystal compositions may be provided within separate microcapsules, with the totality of micro-capsules being blended to provide the total composition filling the cell volume or dielectric spacers may be utilized to divide the volume of each display cell into a like plurality of subvolumes, each containing a different liquid crystal material. Liquid crystal hosts of substantially-constant or variable dielectric anisotropy magnitude and polarity are selected to cause different ones of the plurality of compositions within a cell to switch between transmission and absorption of various visible-wavelengths regions as the frequency and amplitude of an electric field within the cell is varied by control electronics of a display system.

36 Claims, 13 Drawing Figures

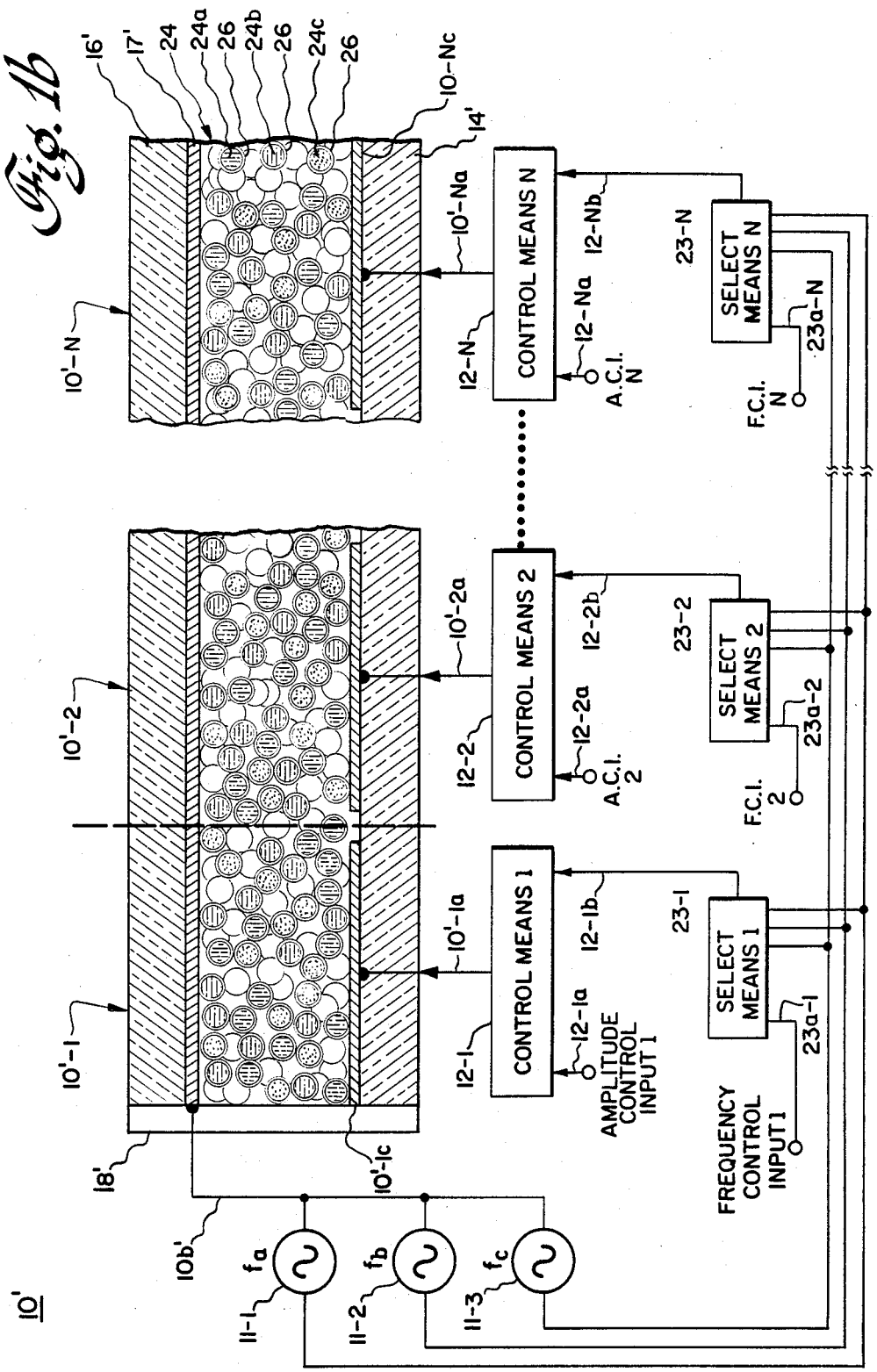

MULTI-COLOR LIQUID CRYSTAL DISPLAY AND SYSTEM

BACKGROUND OF THE INVENTION

The present invention relates to liquid crystal displays and, more particularly, to a novel multi-color liquid crystal display and to a display system using said display.

It is known to the art to provide a liquid crystal display capable of providing a plurality of different viewable colors. Prior art displays of this type generally suffer from low optical efficiency if a given area must be devoted to a particular color component. If interference effects are used, the display will generally have a relatively poor angle-of-view. Similarly, if transverse-type dichroic dyes are guests in the liquid crystal host of the display, a relatively low color purity will result. Further, color choice is relatively limited with almost all prior art displays combining several guest dichroic dyes.

One technique, previously utilized for obtaining a plurality of colors in a given area of a liquid crystal display, is the use of a mixture of so-called longitudinal and transverse dyes having different spectral absorption characteristics. In one orientation of the host liquid crystal material, the absorption of one dye predominates, while in another liquid crystal host orientation, the absorption of the other dichroic dye predominates. Thus, only two colors, of relatively low saturation, are possible.

In another prior art approach to a multi-color matrix display, a matrix of cells is provided with different elements in each cell controlling different primary colors. For example, each cell may contain a triad of elements with each element of the triad having a different one of red, green and blue filters and with a black guest dichroic dye being utilized to control light transmission through any one of the different-colored elements of the cell triad. Because only one of the three elements can contribute to a given color of cell light output, this form of display has a limited efficiency.

It is therefore highly desirable to enable each area, or cell, of the display to produce one of a wide variety of colors, with high purity and by a purely electronic control which can be implemented in a display system completely by circuitry, external to the display itself, driving each of the display cells.

BRIEF SUMMARY OF THE INVENTION

In accordance with the invention, a multi-color liquid crystal display comprises a one-dimensional or two-dimensional matrix of at least one display cell having a plurality of different liquid crystal host-dichroic dye compositions disposed therein. Each cell is defined by a common first electrode and an individual cell second electrode. In the volume between the first and second electrodes of a cell, the plurality of liquid crystal compositions may be disposed by encapsulation of each different composition in a microcapsule, with the totality of microcapsules being blended together to form a microcapsule powder loaded into the cell volume. Alternatively, the display volume is separated into a plurality of isolated subvolumes, of number equal to the number of different liquid crystal compositions, by another plurality, equal to one less than the number of the plurality of compositions, of dielectric layers, spaced parallel to and separated from the cell-defining electrodes and from one another; a different liquid crystal composition is placed in each of a plurality of liquid-tight subvolumes thus provided. The plurality of liquid crystal compositions in each cell is acted upon by a single electric field of variable frequency and variable amplitude formed between the cell electrodes by system electronic means external to the display.

In a presently preferred system embodiment, a waveform generating means provides a signal having a frequency responsive to an external control signal. The variable-frequency signal is connected between the electrode common to all display cells and to one input of each of a plurality of amplitude-control means, equal in number to the number of display cells. Another input of each amplitude-control means receives a signal for setting the amplitude of the variable-frequency signal coupled to the individual second electrode of the associated display cell.

In presently preferred embodiments, two or three liquid crystal compositions are utilized in each display cell to realize up to four or up to seven different viewable and independently-controlled cell colors, respectively.

Accordingly, it is an object of the present invention to provide a liquid crystal display having at least one cell, each capable of being individually driven to a selected one of a plurality of viewable colors.

It is another object of the present invention to provide a novel display system using the novel multi-color display.

These and other objects of the present invention will become apparent upon consideration of the following detailed description, when read in conjunction with the drawings.

BRIEF SUMMARY OF THE DRAWINGS

FIG. 1b is a sectional side view of a portion of another presently preferred embodiment of a multi-color liquid crystal display and its system, in accordance with the principles of the present invention;

DETAILED DESCRIPTION OF THE INVENTION

Figure 1A:
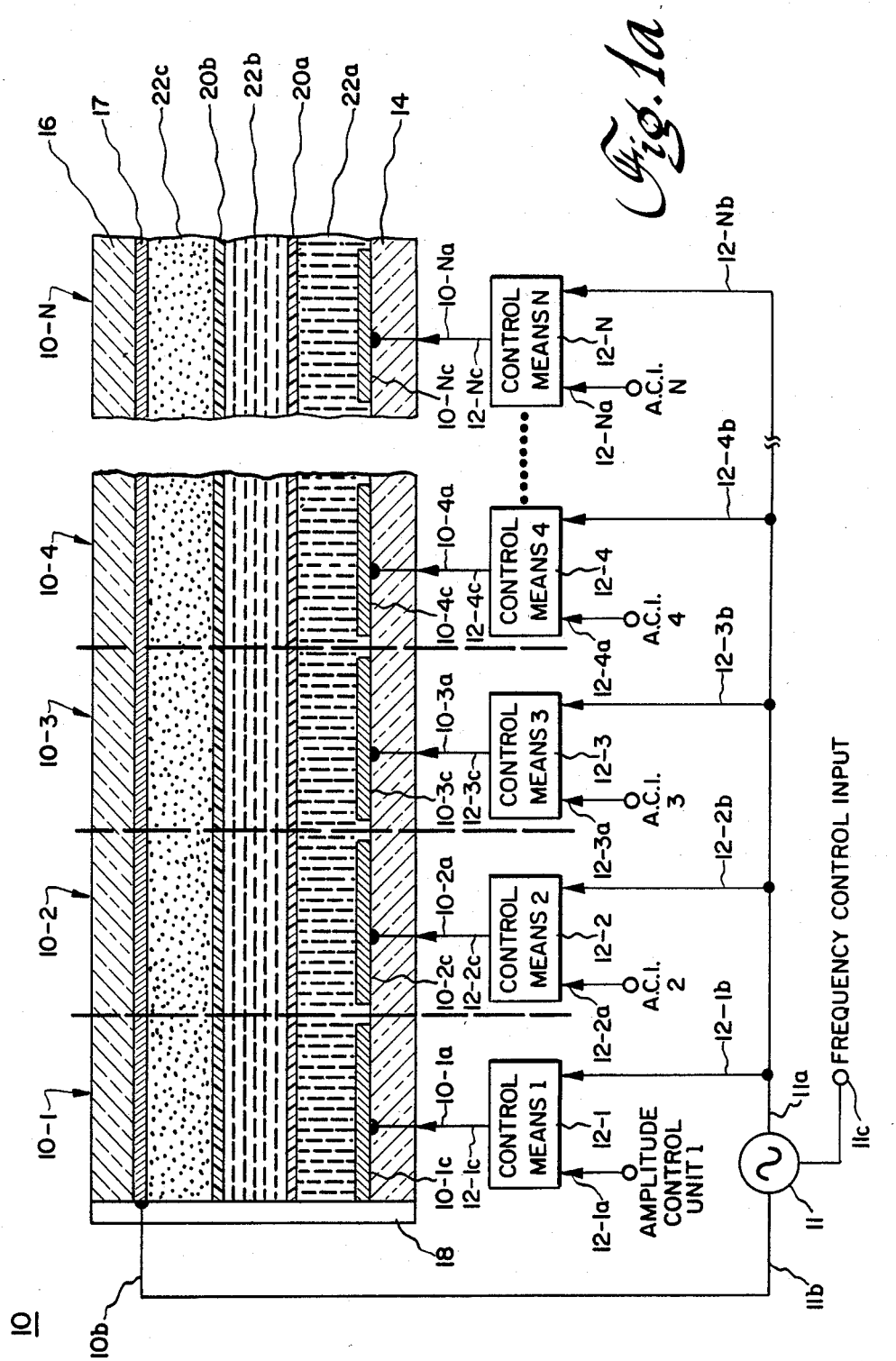
FIG. 1a is a sectional side view of a portion of a first presently preferred embodiment of a multi-color liquid crystal display and its system, in accordance with the principles of the present invention.

Referring initially to FIG. 1a, portion of a first presently preferred embodiment 10 of our multi-color liquid crystal display is illustrated. Display 10 is comprised of a multiplicity of display cells 10-1 through 10-N, which may be arranged along a one-dimensional line (as illustrated) or in a two-dimensional matrix, with additional cells being defined in front of and/or behind each of the cells in the illustrated line of display cells. The display 10 is utilized in a display system with at least one variable-frequency generating means 11, providing a like number of cyclic signals (which may be of sinusoidal, triangular, square or other waveshape and advantageously is of substantially constant peak-to-peak amplitude) between first and second output terminals 11a and 11b, and with a cyclic frequency controlled by the magnitude of a voltage at a frequency control input 11c. A multiplicity of amplitude control means 12-1 through 12-N, of number equal to the number of display cells 10-1 through 10-N, is provided. Each of means 12 receives an amplitude control signal at an associated amplitude control input 12-1a through 12-Na. A second input 12-1b through 12-Nb of the control means 12 are coupled in parallel to one terminal 11a of the cyclic waveform generating means 11. Each of control means 12 provides at an output 12-1c through 12-Nc thereof, the controlled-frequency waveform from source 11, with an amplitude dependent upon the magnitude of the amplitude control signal at the associated input 12-1a through 12-Na. Advantageously, each of control means 12 includes the capability for providing essentially-zero amplitude signals at the associated output. Control means 12 may be any suitable circuit or device, as known to the art, such as an FET and the like.

Each control means output 12-1c through 12-Nc is individually connected to an associated one of a like multiplicity of rear cell electrodes 10-1c through 10-Nc. All of the rear cell electrodes are supported by a display rear substrate 14, which may be fabricated as a unitary planar member. If a transparent rear substrate is required, substrate 14 is fabricated of glass and the like material; if a reflective display is to be utilized, then substrate 14 may be comprised of a material having a reflecting surface. Spaced from rear display substrate 14 is a front display substrate 16, also preferably of unitary planar nature and comprised of a substantially transparent material, such as glass and the like.

A front sheet electrode 17 is fabricated upon the interior surface of display substrate 16, to extend, in common, across one boundary of each of the multiplicity of display cells 10-1 through 10-N. Common electrode 17 is connected, at a display terminal 10b, to the remaining output terminal 11b of the controlled-frequency waveform generating means 11. The volume between substrates 14 and 16 is sealed by a sealing means 18, extending between the peripheral edges thereof. Within the display volume thus formed, first and second dielectric insulating layers 20a and 20b are provided, dividing the display volume into three subvolumes, each having approximately one-third of the total thickness between the display substrates 14 and 16 and having a portion thereof in each of the display cells 10-1 through 10-N. The subvolume immediately interior of substrate 14 is filled with a layer 22a of a first liquid crystal composition, while the intermediate subvolume is filled with a layer 22b of a second liquid crystal composition, and the subvolume immediately interior of display substrate 16 is filled with a layer 22c of a third liquid crystal composition.

Each composition has at least one liquid crystal host material and at least one guest dichroic dye dissolved therein. The liquid crystal host of each of the three liquid crystal layers 22 is characterized by switching from a first optical state to a second optical state with a signal having a frequency-amplitude combination different from the frequency-amplitude combination of the signal at which each of the other two liquid crystal host materials in the remaining layers 22 switches optical states. Each of the different guest dichroic dyes dissolved in each of liquid crystal material layers 22 absorbs a different range of visible wavelengths in one of the first and second optical states. Thus, the first liquid crystal composition of layer 22a may have a first guest dichroic dye dissolved therein which allows light of only a first color, e.g. red, to be transmitted in a first optical state of that liquid crystal composition and allows light of all colors, e.g. white light, to be substantially transmitted in the second optical state of that composition. The second liquid crystal composition of layer 22b may have another guest dichroic dye dissolved therein such that white light is transmitted in the second optical state and light of a different color, e.g. blue, is transmitted through that layer in the first optical state. Similarly, the third liquid crystal composition of layer 22c may include a third guest dichroic dye dissolved therein such that a third color, e.g. green, is transmitted therethrough in a first optical state while white light is transmitted therethrough in the second optical state for that layer. Because a single electric field extends through all layers in each cell of the multiplicity of cells 10-1 through 10-N, the optical states of all layers of that cell are controlled by the amplitude and frequency characteristics of the cell field. The frequency-amplitude characteristics of each cell field are controlled by the magnitude of the signals at the frequency control input 11c and the individual cell amplitude control inputs 12-1a through 12-Na. Thus, the transmissivity of white light through each cell is controlled at various visible-light wavelengths to impart a selected one of a plurality of viewable colors thereto.

Referring now to FIG. 1b, a portion of a second presently preferred embodiment 10' of a multi-color liquid crystal display is illustrated. Display 10' has a multiplicity of individual display cells 10'-1 through 10'-N, each defined by the same common front electrode 17', supported upon a front substrate 16', and an individual one of rear cell electrodes 10'-1c through 10'-Nc, supported upon a rear display substrate 14'. Display 10' is utilized: with a plurality, e.g. three, of fixed-frequency waveform generating means 11-1 through 11-3; a multiplicity of frequency-selection means 23-1 through 23-N; and a multiplicity of amplitude control means 12. One terminal of each of sources 11-1 through 11-3 is connected in parallel to input 10b'; the remaining terminal of each source is connected to the associated one of the first-, second-, or third-frequency inputs of each select means 23. Each select means 23 has a frequency-control selection (F.C.I.) input 23a, for selecting that one of the three frequencies provided by sources 11, for coupling to the associated amplitude control means input 12-Xb, where $1 \leq x \leq N$. It should be understood that the single-generator 11 circuit of FIG. 1a can be used with the display of FIG. 1b, and that the multiple generators 11-1 through 11-3 circuit of FIG. 1b can be used with the display of FIG. 1a. In this manner, each cell of either type of display can have a field of individually-controlled amplitude and frequency established therein.

In display 10', the volume between substrates 14' and 16', and further defined by peripheral edge sealing means 18', is a unitary volume containing microencapsulated liquid crystal elements 24. Each of a selected plurality, e.g. three, different liquid crystal host-dichroic dye guest compositions are microencapsulated in different ones of encapsulating members 26; the three types of microcapsules are then evenly blended to form a "powder" of the plurality of different microcapsules 24. As a single electric field, of frequency and amplitude respectively controlled by respective means 11 and 12 for that cell, is provided within each of cells 10'-1 through 10'-N, the liquid crystal within the microcapsules 24 (in the volume defined for each associated cell) are substantially uniformly acted upon by the single electric field) within that single cell. Thus, in a first field condition all of the microcapsules 24a–24c may transmit white light. In a second field condition, the first composition in a particular microcapsule, will transmit light of a first color, e.g. red. With another field condition present in the cell, the second liquid crystal composition 24b in another microcapsule, will transmit light of another color, e.g. blue. The third liquid crystal composition 24c will transmit light of a third color, e.g. green, in response to yet another field condition in the cell.

Figure 2A:
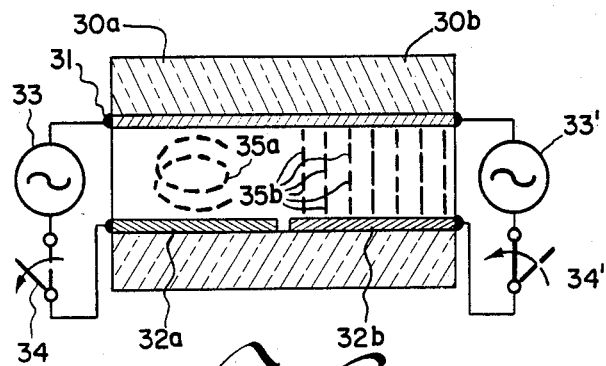
FIG. 2a is a sectional side view of a pair of display cells, illustrating principles of operation thereof.
Figure 2C:
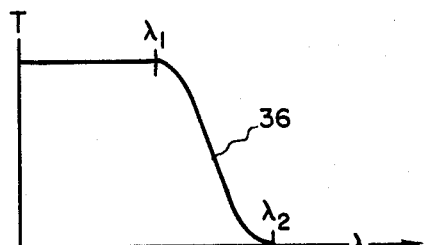
FIG. 2c is a light-transmissivity vs. wavelength curve for a display cell with a particular guest dye.

Referring now to FIGS. 2a and 2c, a pair of cells 30a and 30b are illustrated. The cells have a common front electrode 31 and individual rear electrodes 32a and 32b. Waveform generating means 33 or 33' is connectable, in series with one of switching means 34 or 34', between the common front electrode 31 and the associated one of rear cell electrodes 32a or 32b. As illustrated, a positive-dielectric-anisotropy cholesteric host liquid crystal material is utilized with a guest dichroic dye. In the no-field condition, as illustrated with switch 34 open (solid line position) for cell 30a, the liquid crystal host and its dichroic dye guest molecules obtain the Grandjean texture; the many orientations of the elongated dichroic dye molecules substantially absorb all light, of wavelengths determined by the particular dye (e.g. all light with wavelengths greater than a wavelength $\lambda_2$ in FIG. 2c). Thus, a single dye, or specific dye mixture, will typically absorb light over a range of wavelengths, while allowing light of other wavelengths to be transmitted; if a cyan-colored dye is utilized, blue and green light would be transmitted and red light would be absorbed in cell 30a. In FIG. 2c, the transmissitivity T-wavelength $\lambda$ curve of a particular dichroic dye guest dissolved in a liquid crystal host illustrates that substantially all of the wavelengths below a first wavelength $\lambda_1$ are transmitted with relatively little attenuation, while light of wavelength greater than a second wavelength $\lambda_2$ is substantially attenuated within the dichroic dye molecules. When the switch is closed, as illustrated by the closed (solid line) position of switch 34' for cell 30b, the resulting electric field between electrodes 31 and 32b causes the liquid crystal and dichroic dye molecules to obtain a homeotropic alignment so that light passes through cell 30b with minimum absorption.

Alternatively, the cell boundaries, upon the interior surfaces of electrodes 31 and 32a or 32b may be treated with a surfactant such that homeotropic alignment is achieved in a no-field condition (as now illustrated by the broken blade of switch 34' in the open condition), while a field-present condition (illustrated by the broken switch blade of switch 34 in the closed condition), is required to provide the helical, absorbing state in a cell having a thickness greater than the pitch of a negative-dielectric-anisotropy cholesteric-nematic material.

Figure 2B:
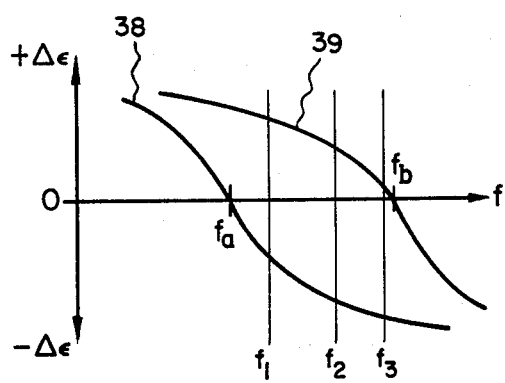
FIG. 2b is a graph illustrating the relationships between dielectric anisotropy and frequency for a display cell using a variable anisotropy material.

Referring now to FIG. 2b at least one of liquid crystal compositions may use a liquid crystal host material of the type having a dielectric anisotropy varying with the field frequency. Characteristically, such host liquid crystal materials have two components of polarizability and have the longitudinal polarizability decrease to a value less than the value of transverse polarizability at some higher frequency. The dielectric anisotropy effectively changes from a positive $+\Delta\epsilon$ value to a negative $-\Delta\epsilon$ value as the frequency increases. Thus, a first material, having characteristics given by a curve 38, has a net positive dielectric anisotropy for excitation at frequencies less than a transition frequency $f_a$ and has a net negative dielectric anisotropy for frequencies above frequency $f_a$; if this material is used at frequencies $f_1$–$f_3$ greater than $f_a$, it appears to always have a negative anisotropy, of increasing magnitude with increasing frequency, and is referred to as a variable-negative-anisotropy (VN) host. A second material, characterized by curve 39, has positive dielectric anisotropy for excitation frequencies less than another, very much higher, transition frequency $f_b$ and has negative dielectric anisotropy above frequency $f_b$; if this material is used at frequencies $f_1$–$f_3$ less than $f_b$, it appears to always have a positive anisotropy, of magnitude decreasing with increasing frequency, and is referred to as a variable-positive-anisotropy (VP) host.

Figure 3A:
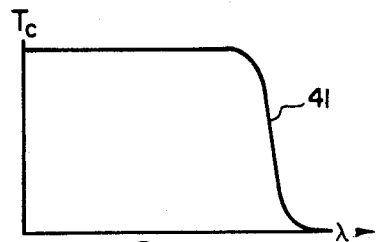
FIGS. 3a–3c are a set of coordinated graphs illustrating the transmissitivity vs. wavelength for a particular combination of three different liquid crystal host-dichroic dye guests in a display of the present invention.
Figure 3B:
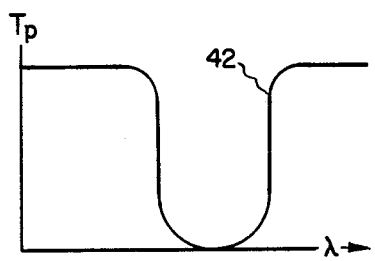
Figure 3C:
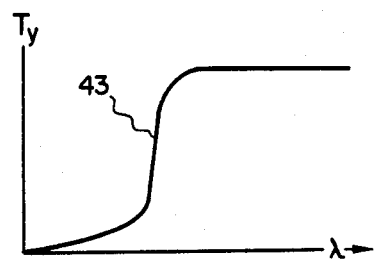

Referring now to FIGS. 3a–3c, a three-composition display will utilize three different absorptive dyes. A first layer in the cell may utilize a host material having a variable-negative dielectric anisotropy with a cyan-transmitting/red-absorbing dye in a homeotropic-to-cholesteric cell, to provide the transmissivity-wavelength curve 41 of FIG. 3a, in the absorptive cholesteric condition (with field applied), the longer (red) wavelengths are absorbed and a blue-green color is imparted to white light passing through the cell. In the other, homeotropic state (no applied field), white light is transmitted and the cell is white. By utilization of a host material, in another layer or group of microcapsules, of relative-constant positive dielectric anisotropy and a purple transmitting/green absorbing dye in a cholesteric-to-homeotropic cell, the cell will have the transmissivity-wavelength curve 42 of FIG. 3b; white light entering the cell will be transmitted, in the no-field-applied condition, as a purple light due to the absorption of the (green) middle wavelengths within the cell. This cell will transmit white light in the field-applied condition. Similarly, a cell having a variable-positive anisotropy host material in a cholesteric-to-homeotropic configuration and with a yellow-transmitting/blue-absorbing guest dye dissolved therein, will provide a transmissivity-wavelength curve 43 as shown in FIG. 3c; in the absorptive (no-field) state, white light entering the cell will be transmitted therethrough as yellow light, due to the absorption of the short (blue) wavelengths. White light will be transmitted in the field-applied condition.

Figure 4:
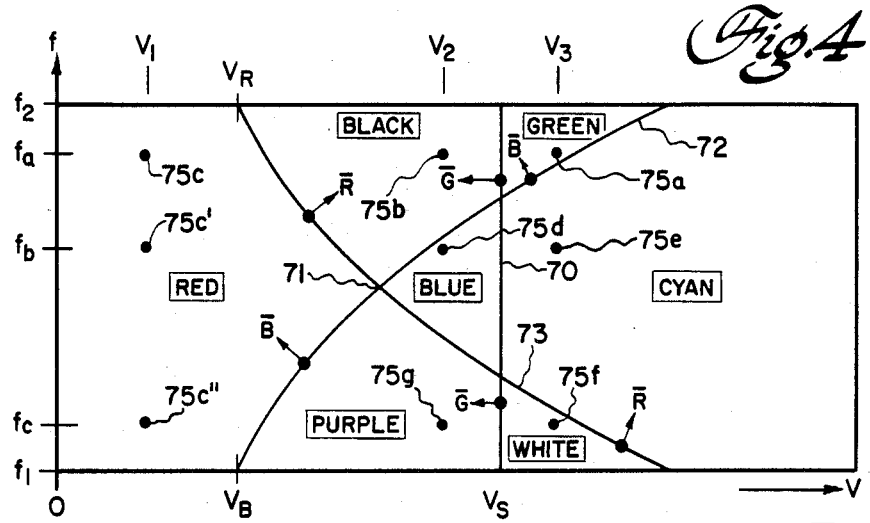
FIGS. 4 and 4a–4d are frequency vs. voltage graphs illustrating several of the possible color sets selectable for each cell of a display, and useful in understanding operation of the present invention.
Figure 4A:
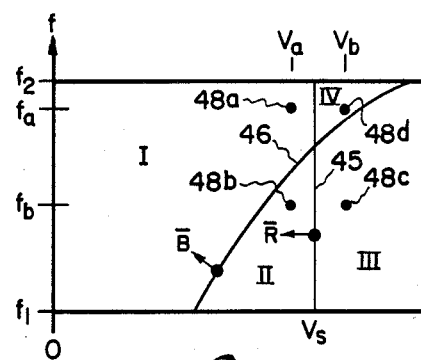

Referring now to FIGS. 4 and 4a–4d, the ability of each display cell to provide one of a plurality of colors is illustrated. Consider first the cell having only two liquid crystal compositions therein. As illustrated in FIG. 4a, this cell has a first layer, or microcapsule group, with a relatively-constant positive-dielectric-anisotropy host and operates in the cholesteric-to-homeotropic mode; a first dichroic dye, absorbing a first band, e.g. red, of wavelengths, is dissolved in this first composition. Therefore, the first composition is in the homeotropic state, and a white light appears white after transmission through the cell, for all applied fields caused by an applied signal of amplitude V greater than some switching, or threshold, potential $V_S$, for all frequencies f (i.e. in the region to the right of composition 1 transition curve 45); in the region to the left of curve 45, for all V less than $V_S$ and at all frequencies f, the cell is in the cholesteric state and some wavelengths (red) are absorbed; the cell would appear to be cyan-colored if only this composition were to be present. The cell also has a second layer, or microcapsule group, with a variable-positive dielectric anisotropy host operating in the cholesteric-to-homeotropic mode; a second dichroic dye absorbing another band, e.g. blue, of wavelengths, is dissolved in this second composition. All wavelengths of a white light will be passed through the cell for a field applied with a voltage magnitude which is to the right of transition curve 46, along which curve the transition voltage increases as frequency increases. This composition absorbs blue wavelengths and appears to have a yellow color, in the cholesteric mode, for all voltage V and frequency f combinations to the left of curve 46. That is, at lower frequencies, near $f_1$, the anisotropy is high and the transition (which is not perfectly sharp, but may be thought of as having a single "boundary" line for purposes of explanation) will occur for a lower voltage (e.g., less than $V_S$); at higher frequencies, near $f_2$, the anisotropy is low and the transition occurs at a higher voltage (e.g. greater than $V_S$).

The drive electronics (means 11 and 12) provide only one signal frequency-amplitude combination at any instant. If that signal has a combination of a higher frequency $f_a$ and a lower amplitude $V_a$, the two compositions are "biased" to operating point 48a. The first and second compositions are both in the cholesteric mode and respectively absorb red and blue wavelengths; the cell appears green to an observer. If means 11 is now commanded to a new, lower frequency $f_b$, with means 12 supplying the same amplitude $V_a$ to the new $f_b$ signal, the cell operates at point 48b. Here, the first composition is still in the cholesteric, red-absorbing mode, but the second composition has transitioned to the substantially unabsorbing homeotropic mode and transmits all wavelengths; the cell output light is deficient in red wavelengths and appears cyan to an observer. If means 12 is now commanded to impart a higher amplitude $V_b$ to the lower $f_b$ signal, the cell operates at point 48c. Both compositions are now in the homeotropic mode and transmit white light; the cell appears white to an observer. Finally, if means 11 operates to raise the signal frequency back to the higher $f_a$ frequency, while means 12 maintains the higher signal amplitude $V_b$, the cell operates at point 48d. Here, the first composition is in the all-wavelength-transmitted homeotropic mode, but the second composition is in the cholesteric mode and absorbs blue wavelengths; the cell appears yellow to an observer. Thus, by shifting between a pair of drive signal frequencies and a pair of drive signal amplitudes, the cell can be controlled to a selected one of four colored conditions (green, cyan, yellow or white).

Figure 4C:
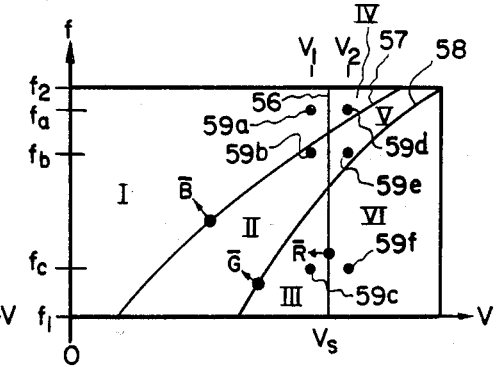
Figure 4B:
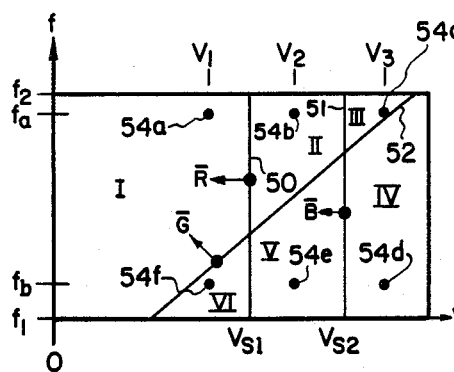

A first exemplary cell having three liquid crystal compositions is illustrated in FIG. 4b. This cell has a first layer, or microcapsule group, with a first relatively-constant positive-dielectric-anisotropy host and operates in the cholesteric-to-homeotropic mode with a first transition voltage $V_{S1}$; a first dichroic dye, absorbing a first band, e.g. red, of wavelengths is dissolved in the first composition. A second relatively-constant positive-dielectric-anisotropy host is present, with a transition voltage $V_{S2}$, greater than the transition amplitude $V_{S1}$ of the first host. The second host operates in the cholesteric-to-homeotropic mode and has a second dichroic dye dissolved therein for absorbing a second band, e.g. blue, of wavelengths. A third liquid crystal composition is of the variable-positive-anisotropy host type, operating in the cholesteric-to-homeotropic mode and having a third dichroic dye dissolved therein for absorption of a third band, e.g. green, wavelengths in the cholesteric mode. Thus, the first composition has a drive signal amplitude-frequency transition curve 50 while the second composition has another straight-line amplitude-frequency transition curve 51, and the third composition has an increasing frequency-increasing amplitude transition curve 52.

In operation, if frequency generating means 11 is set for a first, higher frequency $f_a$, and the cell amplitude control means 12 is set for a lowest drive signal amplitude $V_1$, less than first transition voltage $V_{S1}$, the cell operates at a point 54a in region I. All three compositions are in the cholesteric mode, and red, blue and green wavelengths are respectively absorbed in the respective compositions; the display cell does not substantially transmit any visible wavelength and appears to have a black color to an observer. If amplitude control means 12 receives a control signal to provide another amplitude $V_2$, greater than threshold voltage $V_{S1}$ but less than second threshold voltage $V_{S2}$, the cell operates at point 54b in region II. The first liquid crystal composition is now operating in the homeotropic mode, with substantial transmission of all visible wavelengths, while the second and third compositions still operate in the cholesteric mode. Therefore, blue and green wavelengths are absorbed and the cell now appears to have a red color. Similarly, if means 12 operates to provide a highest amplitude $V_3$, of magnitude greater than second transition voltage $V_{S2}$, at the same high frequency $F_a$, the cell operates at point 54c in region III. The first and second compositions are in the homeotropic all-wavelength-transmission mode and only the third composition is in the cholesteric green-absorbing mode; the cell appears to have a purple color. The control signal to the frequency generating means 11 is now changed to provide a waveform having a lower frequency $f_b$, the cell shifts to operation at point 54d in region IV, with all three compositions operating in the homeotropic mode; a white display cell is observable. Operating at the same lower frequency $f_b$, and at the middle amplitude $V_2$, cell operates at point 54e in region V; the first and third compositions are in the homeotropic mode and the second composition is in the cholesteric mode, absorbing blue wavelengths and providing a yellow cell. A further decrease in amplitude, to lower voltage $V_1$ causes the cell to operate at point 54f in region VI, with the first and second compositions in the cholesteric mode, absorbing red and blue visible wavelengths, but with the third composition in the homeotropic, substantially-nonabsorbing mode; a green cell is therefore observable. Thus, with a pair of constant-positive anisotropy hosts and a variable positive anisotropy host, six different regions (and six different operating colors, with three different dyes) is achievable.

If only one constant positive dielectric anisotropy host and a pair of variable-positive anisotropy hosts are used, the display having the amplitude-frequency diagram of FIG. 4c obtains. The first composition has a substantially constant transition voltage $V_S$ and a transition line 56. The second and third compositions have increasing frequency-increasing amplitude operating lines 57 and 58, with second composition transition curve 57 requiring lesser amplitudes, at the same frequency, than the third composition operating along transition curve 58. Six regions I–VI are thus defined. Illustratively, six operating points 59a–59f are shown, utilizing one of higher and lower amplitudes $V_1$ and $V_2$, and one of higher frequency $f_a$, middle frequency $f_b$ or a lower frequency $f_c$. At the higher frequency $f_a$-lower voltage $V_1$ operating point 59a in region I, all three compositions are operating in the cholesteric mode, substantially absorbing red, blue and green wavelengths, respectively, for a black-appearing cell. Operating at the same lower amplitude $V_1$ but shifting to a medium frequency $f_b$, the cell operates in region II, at point 59b. The first and third compositions are still in the cholesteric mode, absorbing red and green wavelengths, respectively, but the second composition is now in the homeotropic mode, allowing transmission of blue wavelengths, whereby a blue color is obtained from the cell. Further decreasing the frequency to lower frequency $f_c$, at the lower amplitude $V_1$, the cell operates at point 59c in region III; only the first composition is in the cholesteric mode, absorbing red wavelengths. The second and third compositions transmit blue and green wavelengths and the cell has a cyan color. if the highest frequency $f_a$ and the higher amplitude $V_2$ (greater than the transition voltage $V_S$) are used, the cell is operating at point 59d in region IV. The first composition is now in the homeotropic mode and does not absorb red wavelengths; the second and third compositions are still in the cholesteric mode and absorb blue and green wavelengths, whereby the cell has a red color. Maintaining the amplitude at the higher $V_2$ value but shifting to the middle frequency $f_b$, the cell operates at point 59e in region V. Only the third composition remains in the cholesteric mode, absorbing green light, while the first and second compositions are in the homeotropic mode, providing a purple-colored cell. Finally, controlling the drive signal to the lowest frequency $f_c$, at the higher $V_2$ amplitude, the cell operates at point 59f in the VI region. All compositions are now in the homeotropic orientation and relatively little absorption occurs; the cell appears to have a white color to an observer.

Figure 4D:
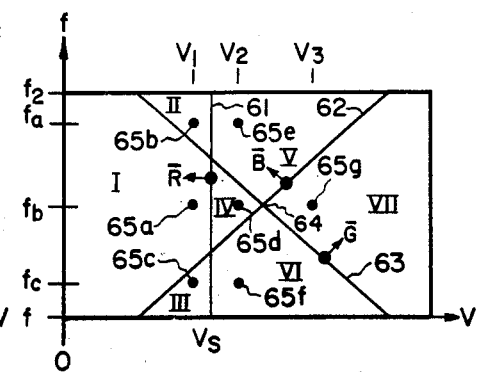

If the polarity of one of the variable anisotropy hosts is changed, the display illustrated in the frequency-amplitude graph of FIG. 4d obtains. In this display the first composition has substantially-constant positive-dielectric-anisotropy with a transition voltage $V_S$; the first composition has a red-absorbing dye dissolved therein. The second composition has a variable-positive dielectric anisotropy, with an increasing frequency-increasing amplitude transition curve 62; the second composition has a blue-absorbing dye dissolved therein. The third composition is a variable-negative dielectric anisotropy host, having an increasing frequency-decreasing amplitude transition curve 63 and operating in the homeotropic-to-cholesteric mode, rather than the cholesteric-to-homeotropic mode of the first and second compositions; the third composition has a green-absorbing dye dissolved therein. The characteristics of the second and third compositions are selected such that the frequency-amplitude point 64 at which the transition curves 62 and 63 cross, is to the right of the constant-anisotropy transition line 61. Seven operating regions I–VII are therefore defined, requiring that three different frequencies (highest frequency $f_a$, middle frequency $f_b$ and lowest frequency $f_c$) be available from frequency generating means 11 and that three different amplitudes be available from amplitude control means 12. A lowest amplitude $V_1$ must be less than the first composition transition amplitude $V_S$, while a second amplitude $V_2$ must be greater than transition amplitude $V_S$ but less than the amplitude of the second-third composition crossover point 64, and a third amplitude $V_3$ must be greater than the crossover point 64 amplitude.

In operation, if the amplitude control means provides the lowest $V_1$ amplitude and the frequency control means 11 provides middle frequency $f_b$, the cell operates at point 65a in region I; the first and second compositions are in their cholesteric state, respectively absorbing blue and red wavelengths. The third composition, being of negative anisotropy, is operating in its homeotropic mode and does not absorb green wavelengths. Therefore, the cell appears to have a green color when viewed by an observer. If the frequency is now changed to highest frequency $f_a$, the cell operates at point 65b in region II; the first and second compositions are still in the cholesteric red-absorbing and blue-absorbing states, respectively, but now the third composition has switched to its cholesteric green-absorbing condition and the cell appears to have a black color. Reducing the frequency to the lowest frequency $f_c$ causes the cell to be operating at point 65c in region III; the first composition is still in the cholesteric red-absorbing mode, but the second composition has now transitioned into the homeotropic all-wavelength transmission mode, while the third composition has again entered the homeotropic all-wavelength transmission mode. Thus, only red wavelengths are absorbed and the cell appears to have a cyan color. If the amplitude control means 12 is now commanded to the middle $V_2$ amplitude and the frequency control means 11 is commanded first to the middle frequency $f_b$, then to the higher frequency $f_a$ and then to the lowest frequency $f_c$ condition, the display will subsequently switch from operating point 65d in region IV to operating point point 65e in region V to operating point 65f in region VI. It will be seen that the display cell respectively appears yellow, red and white in the respective ones of these three regions. If the display is now driven with a waveform at the middle frequency $f_b$ and the highest amplitude $V_3$, operation of point 65g in region VII is obtained, with only green-wavelength absorption; the display appears to have a purple color. It should be understood that if the third and highest amplitude is shifted to an amplitude greater than some amplitude $V_x$, the cell will operate in the purple-colored region VII for any of the three driving signal frequencies, and will thus be frequency-independent for operations at this highest drive amplitude.

Returning now to FIG. 4, it is presently preferred to operate a three-component cell with a constant-positive dielectric anisotropy first composition having a transition line 70 of potential amplitude $V_S$ which is greater than the potential associated with a point 71 at which the operating curve 72 of a variable-positive dielectric anisotropy second composition crosses the operating curve 73 of a variable-negative dielectric anisotropy third composition. The first, second and third hosts have respective green-absorbing, blue-absorbing and red-absorbing dichroic dyes respectively dissolved therein. A three-frequency/three-amplitude driving signal scheme is also required for this embodiment. The first and second amplitudes $V_1$ and $V_2$ are selected to be less than the transition amplitude $V_S$, with lowest amplitude $V_1$ also being selected to be less than the lower of the amplitudes $V_R$ and $V_B$ at which curves 73 and 72, respectively, respectively cross the maximum operating frequency $f_2$ and minimum operating frequency $f_1$ lines. The highest amplitude $V_3$ is selected to be greater than the transition amplitude $V_S$. Upper frequency $f_a$ is selected to operate the cell at a first operating point 75a in conjunction with amplitude $V_3$; at operating point 75a, the first composition is in the homeotropic mode, while the second and third compositions are in the respective cholesteric blue-absorbing and cholesteric red-absorbing modes, to provide a green display cell color. For the same upper frequency, reducing the driving signal amplitude to the middle amplitude $V_2$ value places the cell at operating point 75b, wherein all three compositions are operating in the cholesteric mode and a black color is imparted to the display cell. Further reducing the drive to the lowest $V_1$ amplitude at the upper $f_a$ frequency operates the cell at point 75c, with the first and second compositions in their green-absorbing and blue-absorbing cholesteric modes. The third composition is operated in its normal homeotropic mode and a red display cell is obtained.

The middle frequency $f_b$ is chosen such that when utilized in conjunction with the middle $V_2$ amplitude, the display operates at point 75d, in the region where the first and third compositions are in their cholesteric modes and the second composition is in the homeotropic mode. Therefore, green and red wavelengths are absorbed and a blue-colored display cell is provided. At the same middle frequency, an increase in the driving signal amplitude to the largest $V_3$ amplitude operates the cell at point 75e, wherein the first and second compositions are in the homeotropic mode and only the third composition is in the red-absorbing cholesteric mode; a cyan-colored display results. If the cell is operated at the middle frequency and the lowest $V_1$ amplitude, operating point 75c' obtains; it will be seen that the cell has the same red color as would obtain for operation at any allowable frequency at this lowest $V_1$ amplitude.

The lowest frequency $f_c$ is selected to place the cell at operating point 75f, in conjunction with the highest $V_3$ amplitude. At operating point 75f, all of the compositions are in their substantially-transmitting homeotropic modes and white light is passed through the cell. At the lowest $f_c$ frequency and middle amplitude $V_2$, the cell operates at point 75g, wherein only the first composition is the green-absorbing cholesteric mode and the second and third compositions are in the substantially-transmissive homeotropic mode; the display cell has a purple appearance. It will also be seen that operation at the lowest frequency and lowest amplitude (point 75c") has the same effect as operating at any frequency with the lowest amplitude, as previously mentioned. The color scheme of FIG. 4 is especially advantageous in that a failure of the drive signal will place the cell in a red (danger-indicating) condition. Further, this color scheme provides a maximum (seven) of different colors for three different dichroic liquid crystal compositions, wherein a yellow display cell is not provided, as a viewer may often confuse white and yellow display states.

While several presently preferred embodiments of our novel multi-color liquid crystal display have been described in detail herein, many modifications and variations will become apparent to those skilled in the art. It is our intent, therefore, to be limited only by the scope of the appending claims and not by way of the specific details and instrumentalities presented by way of description of the presently preferred embodiments herein.

What we claim is:

1. A display, providing any selected one of a plurality of colors in each of at least one cell thereof, with each cell having opposed first and second surfaces, comprising:

a plurality of liquid crystal compositions, each comprised of a liquid crystal host and a guest dichronic dye, each composition being responsive to a set of amplitude and frequency characteristics, different from the sets of amplitude and frequency characteristics of all other compositions, of a single electric field in said cell, with each composition (1) absorbing a different range of visible wavelengths from the range of visual wavelengths absorbed by each other composition, in a first optical condition, and (2) transmitting substantially all visible wavelengths in a second optical condition;

means for containing the plurality of compositions in separation from one another in each of said at least one cell; and means disposed only upon said first and second cell surfaces for providing a single electric field simultaneously through all of said plurality of compositions in each cell, with a set of electric field frequency and amplitude characteristics determined by external stimuli, to selectively switch said plurality of compositions between said first and second optical conditions in selected combinations to determine the visible color of light transmitted through that cell.

2. The display of claim 1, wherein said field-forming means comprises first and second conductive electrodes each respectively disposed upon the respective one of the first and second cell surfaces.

3. The display of claim 2, wherein said display has a plurality of cells and all of the first electrodes in all of said cells are connected in common with one another.

4. The display of claim 3, wherein the second electrode in each cell is separate from the second electrode in all other cells of the display.

5. The display of claim 1, wherein each cell has opposed first and second surfaces; and said containing means comprises means for dividing the volume between said first and second surfaces into a plurality of subvolumes, of number equal to the number of the plurality of compositions; each subvolume containing a different one of said plurality of compositions.

6. The display of claim 5, wherein said dividing means comprises a second plurality, equal in number to one less than the number of said plurality of compositions, of thin insulative members, spaced from one another between said first and second surfaces of said cell.

7. The display of claim 6, wherein said insulative members are substantially planar and disposed substantially parallel to one another.

8. The display of claim 7, wherein said first and second surfaces are substantially planar and disposed substantially parallel to one another, and said planar insulative members are disposed substantially parallel to said surfaces.

9. The display of claim 8, wherein said insulative members are spaced substantially equal distances from one another and from said cell surfaces.

10. The display of claim 9, wherein said display contains a plurality of cells, each cell having the same number of said insulative members therein, with said members extending in integral fashion through all of said cells of said display for forming said plurality of sub-volumes each in isolation from the other.

11. The display of claim 1, wherein said containing means comprises a multiplicity of microcapsules, each containing only one of the plurality of compositions; a plurality of the microcapsules containing each composition being blended together with other pluralities of microcapsules containing each different composition to form a microcapsule powder; said microcapsule powder substantially filling each cell of said display.

12. The display of claim 11, wherein substantially equal numbers of microcapsules of each of said plurality of compositions are blended together to form said microcapsule powder.

13. The display of claim 1, wherein the host liquid crystal material is a cholesteric liquid crystal material.

14. The display of claim 13, where at least one host liquid crystal material has a substantially constant dielectric anisotropy.

15. The display of claim 14, wherein said at least one host material has a substantially constant positive dielectric anisotropy.

16. The display of claim 14, wherein said host material is in the cholesteric state in said first optical condition and is in a homeotropic state in said second optical condition.

17. The display of claim 13, wherein at least one host material has a variable dielectric anisotropy.

18. The display of claim 17, wherein said variable anisotropy host material is in a cholesteric state in said first optical condition and is in a homeotropic state in said second optical condition.

19. The display of claim 17, wherein said host material has a variable positive dielectric anisotropy.

20. The display of claim 17, wherein said host material has a variable negative dielectric anisotropy.

21. The display of claim 20, further comprising means for forcing said host material into a homeotropic alignment in the absence of an electric field in said cell.

22. The display of claim 1, having a pair of dichroic liquid crystal compositions of substantially constant dielectric anisotropy with each composition having a threshold voltage, at which it is switched from said first optical condition to said second optical condition, substantially different from the another.

23. The display of claim 22, wherein each of the pair of dichroic liquid crystal compositions has a substantially constant positive dielectric anisotropy.

24. The display of claim 14, having a pair of dichroic liquid crystal compositions; a first dichroic-liquid crystal composition having a substantially constant dielectric anisotropy and the second dichroic liquid crystal composition having a variable dielectric anisotropy.

25. The display of claim 24, wherein the variable anisotropy material has a variable positive dielectric anisotropy.

26. The display claim 24, wherein the variable anisotropy material has a variable negative dielectric anisotropy.

27. The display of claim 1, having three different dichroic liquid crystal compositions, each having a dielectric anisotropy characteristic different from the dielectric anisotropy characteristics of the remaining compositions.

28. The display of claim 27, wherein two of said compositions have substantially constant dielectric anisotropy and each has a threshold voltage, at which said composition switches from said first optical condition to said second optical condition, substantially different from one another; and the third composition has a variable dielectric anisotropy.

29. The display of claim 27, wherein a first composition has a substantially constant positive dielectric anisotropy and the remaining pair of compositions each have a variable dielectric anisotropy, each with a different relationship defining the electric field frequency and amplitude characteristics required to switch the associated material from said first optical condition to said second optical condition.

30. The display of claim 29, wherein each of said variable dielectric anisotropy host materials has a variable positive dielectric anisotropy.

31. The display of claim 29, wherein each of said variable dielectric anisotropy host materials has a different dielectric anisotropy polarity.

32. The display of claim 31, wherein a frequency-amplitude point, at which the switching curves of said opposite-polarity variable dielectric anisotropy materials cross, has an amplitude greater than the switching amplitude for the substantially constant dielectric anisotropy material.

33. The display of claim 31, wherein a frequency-amplitude point, at which the switching curves of said opposite-polarity variable dielectric anisotropy materials cross, has an amplitude less than the switching amplitude for the substantially constant dielectric anisotropy material.

34. In combination, the display of claim 1, having a plurality of individually switchable cells; and means for providing a signal having a controllable frequency-amplitude characteristic to each of said plurality of cells to control the visible color thereof.

35. The combination of claim 34, wherein said signal-providing means comprises: means for generating a signal having a frequency variably responsive to a first input signal; and a plurality of means, each associated with a different display cell, for controlling the amplitude of the variable-frequency signal applied to an associated display cell, responsive to an individual cell amplitude control input signal.

36. The combination of claim 34, wherein said signal-providing means comprises: means for simultaneously generating each of a plurality of signals each having a different selected frequency; a plurality of first means, each associated with a different display cell, for selecting one of the plurality of different-frequency signals responsive to an individual cell frequency control signal; and a like plurality of second means, each also associated with a different display cell, for controlling the amplitude of the signal, selected by the associated first means, applied to the associated display cell, responsive to an individual cell amplitude input signal.

* * * * *